United States Patent [19]

Winter et al.

[11] Patent Number: 4,697,282
[45] Date of Patent: * Sep. 29, 1987

[54] TELEPHONE OPERATOR VOICE STORAGE AND RETRIEVAL SYSTEM

[75] Inventors: Walter W. Winter, Melbourne; Steven E. Gothard, Palm Bay; John H. Drew, Indialantic, all of Fla.

[73] Assignee: Golden Enterprises, Inc., Melbourne, Fla.

[*] Notice: The portion of the term of this patent subsequent to Nov. 8, 2003 has been disclaimed.

[21] Appl. No.: 876,394

[22] Filed: Jun. 20, 1986

Related U.S. Application Data

[63] Continuation of Ser. No. 601,711, Apr. 18, 1984, Pat. No. 4,623,761.

[51] Int. Cl.[4] .............................................. H04M 3/50
[52] U.S. Cl. ........................................ 379/67; 379/84; 379/88; 379/213
[58] Field of Search ....................... 379/77, 82, 84, 88, 379/89, 213, 214, 71, 91, 79, 67

[56] References Cited

U.S. PATENT DOCUMENTS

| | | | |
|---|---|---|---|
| 3,920,908 | 11/1975 | Kraus | 379/91 |
| 4,032,712 | 6/1977 | Catto et al. | 360/71 X |
| 4,066,847 | 1/1978 | Giordano | 379/82 |
| 4,255,618 | 3/1981 | Danner et al. | 381/77 X |
| 4,277,649 | 7/1981 | Sheinbein | 379/201 |
| 4,313,035 | 1/1982 | Jordan et al. | 379/207 |
| 4,328,396 | 5/1982 | Theis | 379/71 |
| 4,355,207 | 10/1982 | Curtin | 379/67 |
| 4,359,607 | 11/1982 | Hannig et al. | 379/88 |
| 4,420,656 | 12/1983 | Freeman | 379/73 |

Primary Examiner—Thomas W. Brown
Attorney, Agent, or Firm—Antonelli, Terry & Wands

[57] ABSTRACT

A telephone operator voice storage and retrieval system is capable of presenting to the caller a played-back, previously recorded response message in the actual voice of the operator on duty at the time. The operator is also able to follow-up the played back, previously recorded response message with a conversation with the caller, without the caller detecting a change in the characteristics of the caller's perceived operator voice. The storage and retrieval system employs a voice analyzer/synthesizer coupled between a response message memory and an audio interface to the operator's audio equipment (headset). After the storage of a series of response messages, prepared by the operator, the system is ready for use in answering incoming calls. In this playback mode, as incoming calls are monitored, the appropriate operator's voice enunciated response message is accessed from memory and, via the voice synthesizer and an audio interface, that message is played back to the caller. When the caller speaks again, the operator, who has been on-line the entire time but has been relieved of the need to actually recite the response phrase, now proceeds to converse with the caller. The audio interface contains automatic level control circuitry which ensures that there is effectively no difference in the recorded voice played back to the caller and the "live" voice spoken by the operator. As a result, the storage and retrieval system is listener transparent.

23 Claims, 3 Drawing Figures

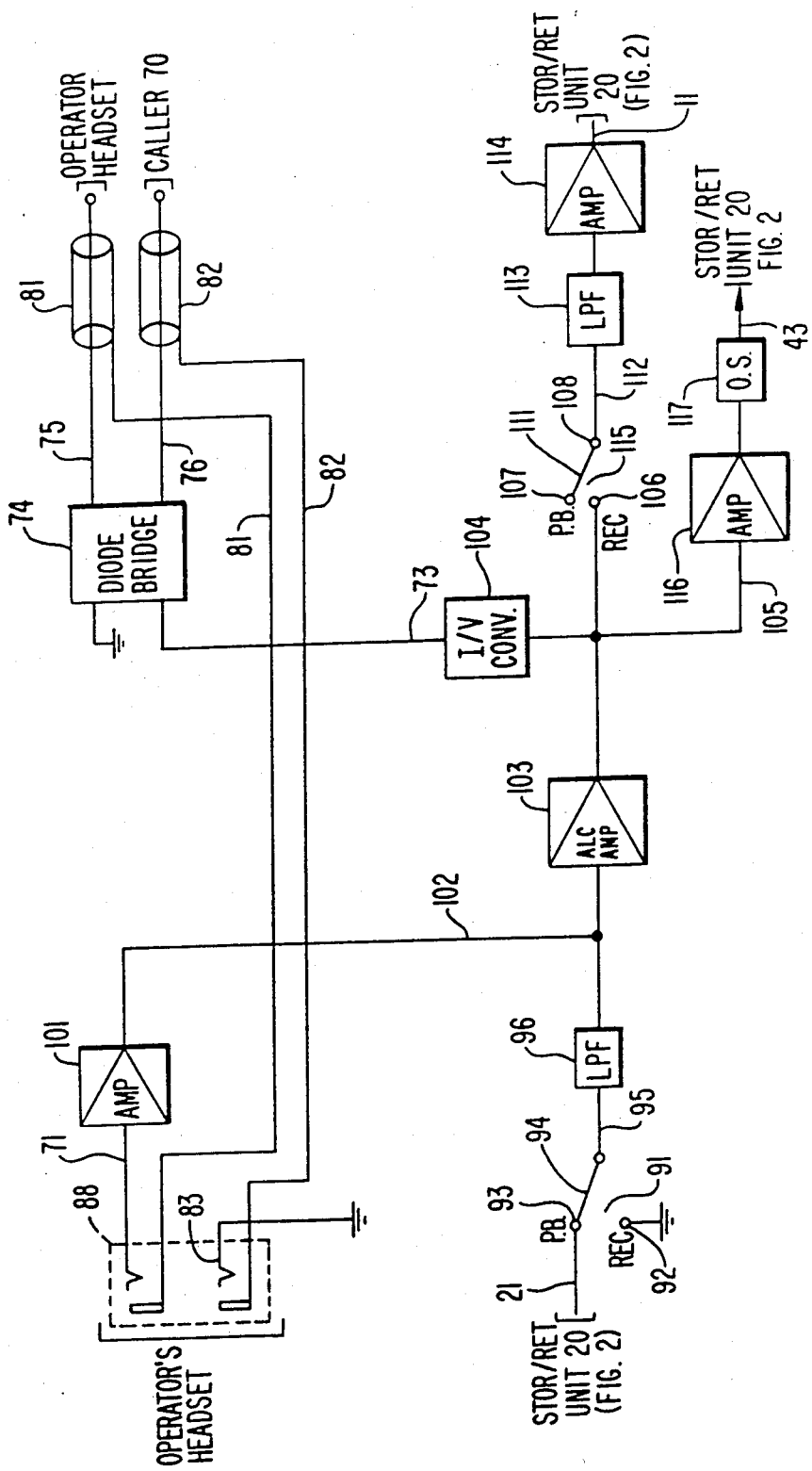

TELEPHONE OPERATOR VOICE STORAGE AND RETRIEVAL SYSTEM

This is a continuation of application Ser. No. 601,711 filed Apr. 18, 1984, now U.S. Pat. No. 4,623,761, issued Nov. 18, 1986.

FIELD OF THE INVENTION

The present invention relates, in general, to telephone systems and is particularly directed to a call answering scheme through which a prerecorded response message is returned to the calling party, either through operator control, or automatically, while permitting the operator to remain on-line and have the ability to inject his/her voice into the communication link to the calling party without any detectable change in quality of the voice being received by the calling party.

BACKGROUND OF THE INVENTION

Operator-assisted telephone service facilities, such as directory assistance, PBX and Toll Service, require that the service operator handle a large number of similar calls over the operator's work period, with the number of daily incoming requests for assistance typically varying from 800 to 1,300, depending upon the time of day and year. Previous attempts to reduce the operator's work time employed automatic response systems which contain prerecorded messages usually stored on electromechanical storage and retrieval devices (e.g. magnetic tape cassette or disk devices). Unfortunately, such systems do not alleviate the operator's burden of performing what is effectively a monotonous routine. Also, differences in voice characteristics (e.g. tonal quality, accent, gender) tend to create a negative customer reaction.

An additional problem is the fact that it is extremely difficult for an operator to answer similar calls with the same enthusiasm, courtesy and efficiency over an extended period of time. Incoming calls are placed by customers whose service requests to them are unique and, as such, the customers expect the service provided by the operator to be helpful, courteous and efficient. If, however, the customer's call is answered by an operator whose voice response is less than desired or, even worse, by a mechanical-sounding prerecorded response message prepared by one person's voice and then followed by the voice of the operator, which not only is different from that of the intercepting response message but conveys a tone that is less than customer-courteous to the caller, it can readily be appreciated how the caller may be confused and often disappointed in the service.

SUMMARY OF THE INVENTION

In accordance with the present invention, the need to provide the operator with a mechanism for reducing the monotonous routine of answering similar types of calls while avoiding drawbacks of conventional automatic response systems, such as those mentioned above, is satisfied by a telephone operator voice storage and retrieval system that is capable of presenting to the customer (caller) a response message (selected from a library of approved answering phrases that have been determined to be the most effective for the inquiries received) in the actual voice of the operator that is on duty at the time. At the same time the present invention permits the operator to follow-up the played-back message with a conversation with the caller, without the caller detecting a difference in the characteristics of the played-back voice and the "live" operator's voice, so that operator voice response message storage and retrieval system of the invention is effectively transparent to the caller.

For this purpose the present invention employs a voice analyzer/synthesizer coupled between a response message memory and an audio interface to the operator's audio equipment (headset). The memory is preferably a high speed/high density semiconductor RAM (such as one contained in the form of a modular cartridge) into which response messages read aloud by the operator are stored after being digitized by the voice analyzer, during the record mode of the system. After a series of approved response messages, as prepared by the on-duty operator, have been stored, the system is ready for use in responding to incoming calls. In this (playback) mode, incoming calls are answered, either by the operator or automatically and, in accordance with the type of call received, the appropriate operator's voice-enunciated response message that had been previously entered into memory is accessed. Then, via the voice synthesizer and an audio interface, that message (in the operator's own voice) is played back to the caller. When the caller speaks again, the operator, who has been on-line the entire time but has been relieved of the need to actually recite the response message, now proceeds to converse with the caller. The audio interface contains automatic level control circuitry which ensures that there is effectively no difference in the audio level of the recorded voice played back to the caller and the "live" voice spoken by the operator. As a result, because the recorded message is in the operator's own voice and both live voice and played-back voice are coupled over the same signal flow path, the storage and retrieval system is effectively listener transparent. This listener transparency is an especially attractive feature of the present invention, as it prevents the operator's "live" voice from confusing the caller, as, for example, would be the case if the response message was given in a female voice abruptly followed by the voice of a male operator handling the remainder of the live call, or releasing a portion of the call to another voice generated by a conventional automatic response system.

The audio interface portion of the system provides full duplex voice transmission (and level control) capability, allowing the operator to hear the caller's voice regardless of line or equipment variations or caller's idiosyncrasies in telephone usage. Advantageously the system makes use of microelectronics signal processing and storage components making it adaptable with a variety of telephone systems and readily intercoupled with an existing operator's console.

BRIEF DESCRIPTION OF THE DRAWINGS

FIG. 3 is a schematic diagram of the audio interface unit of the scheme shown in FIG. 1.

DETAILED DESCRIPTION

Figure 1:
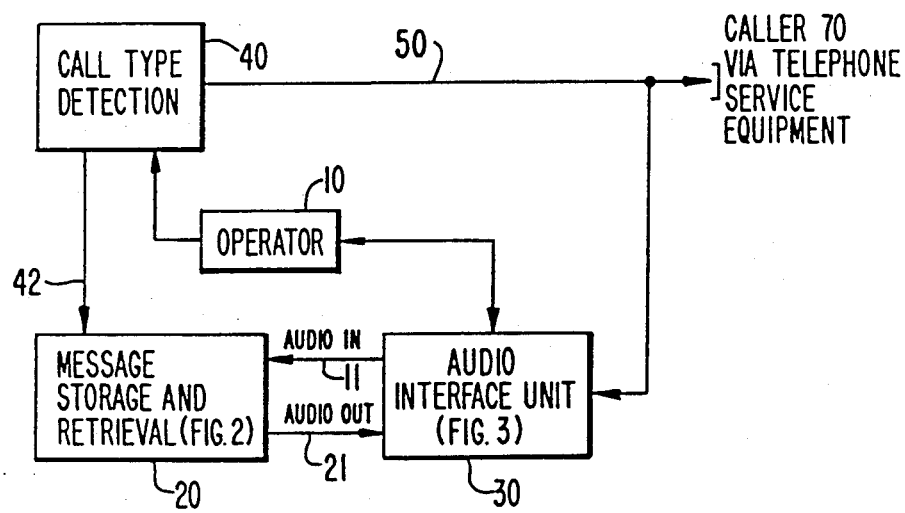
FIG. 1 is a simplified block diagram showing of the telephone operator voice message storage and retrieval scheme of the present invention.

Before describing, in detail, the particular improved telephone operator voice storage and retrieval system in accordance with the present invention, it should be observed that the invention resides primarily in a novel structural combination of conventional data/signal processing components and communication circuits, and not in the particular detailed configurations thereof. Accordingly, the structure, control and arrangement of these conventional components and circuits have, for the most part, been illustrated in the Drawings by readily understandable block representations and schematic diagrams, which show only those specific details that are pertinent to the present invention, in order not to obscure the disclosure with structural details which will be readily apparent to those skilled in the art having the benefit of the description herein. Thus, for example, multi conductor busses are simplified and power supply terminals and leads have been omitted for clarity. In addition, various portions of an electronic data processing system have been appropriately consolidated and simplified in order to emphasize those portions that are most pertinent to the invention. Thus, the block diagram illustrations of the Figures do not necessarily represent the mechanical structural arrangement of the exemplary system, but are primarily intended to illustrate the major structural components of the system in a convenient functional grouping, whereby the present invention may be more readily understood.

Referring now to FIG. 1 of the drawings, there is shown a generalized block diagram of the telephone operator voice storage and retrieval system of the invention which is to be associated with an operator-assisted telephone service facility. Such a facility is coupled to a link 50 which includes both voice and call identification lines for handling and responding to requests from a caller or customer 70. The tip and sleeve portions of the telephone link are coupled to an audio interface unit 30 (to be described in detail below with reference to FIG. 3), while those links indicating the type of incoming call are coupled to a detector 40. It is to be observed here that both the voice and type of call information have been shown as a single link 50 in FIG. 1 for purposes of simplifying the illustration and description. The actual signal conveying conductors and detection circuitry for establishing the type of call are conventional and need not be described here for an understanding of the invention.

Call-type detector 40 may be of conventional configuration employing a bank of indicators monitored by an operator 10 who, via a switch panel interface, selects an appropriate code for identifying the type of response message to be returned to the caller 70. This would normally involve the operator monitoring an optical read-out panel of call-type detector 40 and then, via a switch panel interface, causing the playback of a stored response message, such as from a magnetic tape cassette. Rather than have the operator perform this task, however, it is possible to employ a bank of associated detectors, such as opto-electronic detectors, coupled with the indicator unit of the call-type detector 40 of the telephone service facility of interest, which supplies a set of codes over a link 42 to a message storage and retrieval system 20, to be described below with reference to FIG. 2. In other words, the type of call being detected may be monitored manually by the operator and the information identifying the type of call coupled to the message storage and retrieval system 20 by an operator switch panel interface, or it may be handled automatically without operator intervention.

The operator 10 is also coupled to the audio interface unit 30 by way of his/her headset, so that an on-line, "live" voice communication may be established between the operator 10 and the caller 70. Pursuant to the present invention, however, the initial conversation/response voice interface between the telephone service facility and the caller 70 is provided from the message storage and retrieval unit 20 without the need for the operator 10 to speak directly to the caller 70. As mentioned previously, this not only provides the intended relief for the operator 10, but ensures that the caller is supplied with the correct response message voice reply (i.e a preestablished customer-oriented and optimized response that has been previously recorded by the operator in his/her own voice so that the message is pleasing and informative to the listener).

Audio interface unit 30, in addition to providing on-line communication capability between the operator 10 and the caller 70, serves to provide automatic voice level adjustment for all audio that is coupled to the caller 70, whether that audio be generated from the operator's headset or from the message storage and retrieval unit 20. Audio signal coupling between the audio interface unit 30 and the message storage and retrieval unit 20 is effected over input/output links 11/21.

Figure 2:
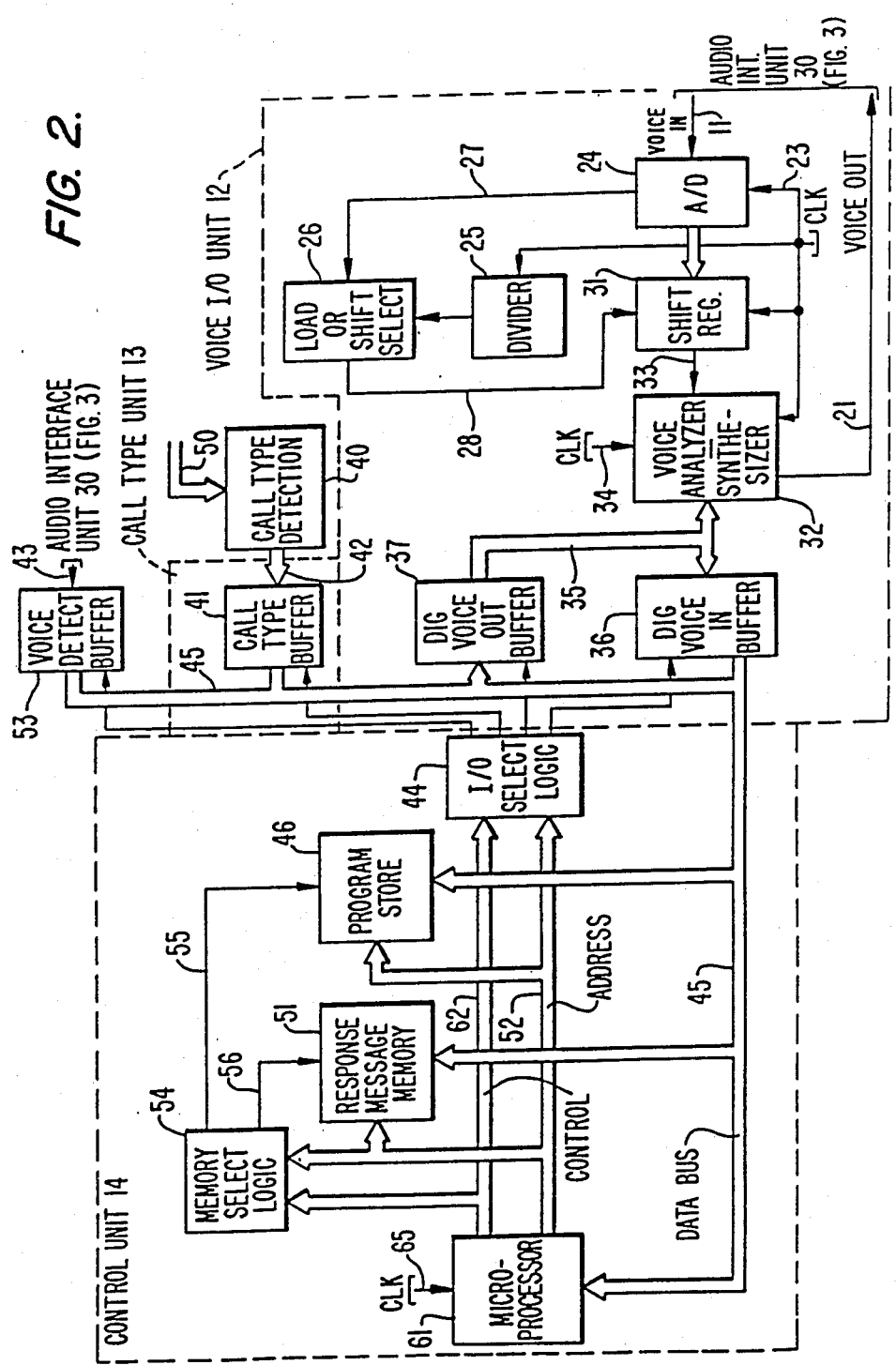
FIG. 2 is a schematic block diagram of the digitized voice storage and retrieval unit of the scheme shown in FIG. 1.

Referring now to FIG. 2, a schematic block diagram of the message storage and retrieval unit 20 is illustrated as being comprised of a voice input/output unit 12, a call type unit 13 and a control unit 14. Voice input/output unit 12 is coupled to audio interface unit 30 by way of audio input link 11 and audio output link 21. Audio input signals input over link 11 represent voice signals generated by the operator 10 during the response message "record" mode of operation of the system for storing response messages to be later played back to reply to incoming calls. These audio signals are digitized and analyzed within the voice input/output unit 12 and stored in digital form in memory in the control unit 14. Similarly, such stored digital encoded voice messages are read out from memory in the control unit 14, synthesized and coupled over link 21 to the audio interface unit 30 for playback to a caller 70.

Call type unit 13 effectively comprises a buffer for storing an indication of the type of call for which a reply message is to be generated. Call type unit 13 is coupled to the detector 40, either by way of a switch panel that is operator-controlled or through an automatic detector, such as an opto-electronic detector, which monitors the operator/attendant's telephone facility terminal. The data that is stored in buffer 41 is accessed by a control unit 14 for selecting the appropriate response message that has been stored in memory to be read-out and generated as a reply message to be delivered to the caller 70.

The control unit 14 contains processor, memory and communication bus components for controlling the operation of message storage and retrieval unit 20 as operator-generated response messages are stored and later accessed and delivered to a caller, depending upon the type of call buffered by call type unit 13.

DIGITAL STORAGE AND RETRIEVAL UNIT (FIG. 2)

Looking now, in greater detail, at the components of the response message storage and retrieval unit 20 of FIG. 2, within the voice input/output unit 12, audio input link 11, which receives analog input signals corresponding to the audio voice supplied by the audio interface unit 30, is coupled to an analog-to-digital converter (ADC) 24. ADC 24 samples and digitizes the audio input signal and couples the quantized-encoded sample values to a shift register 31. Shift register 31 serializes out the digitized voice signal samples supplied by ADC 24 over link 33 to a voice analyzer/synthesizer 32. (As mentioned previously, each of the components employed in the present invention is well known, so that no detailed description thereof need be supplied here. For example, the voice analyzer/synthesizer unit 32 may be a commercially available unit from OKI Semiconductor.)

For providing the sampling and communication timing among units 24, 31 and 32, a clock source is coupled over link 23 to each of ADC 24, shift register 31 and analyzer/synthesizer 32. It is also coupled to a divider 25 to reduce the frequency for accessing and controlling a load or shift select circuit 26 which is coupled to ADC 24 over link 27 and to shift register 31 over link 28. Shift select logic unit 26 provides the appropriate digitized transfer coupling between ADC 24 and shift register 31, in a customary fashion. A separate clock is coupled over link 34 to analyzer/synthesizer 32 for providing the control of the read-out analyzer/synthesizer 32.

The analog voice that is supplied from synthesizer portion of unit 32 is coupled over link 21 to the audio interface unit 30 in FIG. 3, to be described below. The digitized voice components supplied from the analyzer portion of unit 32 are coupled as digitized voice data over interface 35 to a buffer 36. Similarly, the synthesizer portion receives digitized voice data from an output buffer 37 to which voice message words read out of memory stored in the control unit 14 are coupled, as will be described below.

Each of buffers 36, 37, 41 and a buffer 53 is coupled to data bus 45 within the control unit 14. Buffer 53 is coupled over link 43 to audio-interface unit 30 (FIG. 3) and stores a voice detection signal coupled thereto from unit 30. Data bus 45 includes communication highway conductors for conveying both data and a portion of the address signals to be employed within the control unit 14 for accessing the various components thereof. In the exemplary embodiment, data bus 45 may be a commercially available Z-80 type bus structure.

Control unit 14 is an intelligent-based unit under control of microprocessor 61, which is coupled to data bus 45, to an address bus 52 and to a control bus 62 in a conventional manner. The clock source for microprocessor 61 is coupled over link 65.

In addition to microprocessor 61, control unit 14 includes a response message memory 51, such as a static RAM in the form of a pluggable modular cartridge, and a program store unit 46. Each of memories 51 and 46 is coupled to data bus 45 and to address bus 52 for access by microprocessor 61. Program store unit 46 stores the instruction set for controlling the operation of the storage and retrieval unit and the manner in which it interfaces with the remainder of the system. As that instruction set may take on a number of forms depending upon the desires of the programmer, it will not be described in detail here. Instead, the operational scenario carried out by the program stored in memory 46 will be described, in order to provide a more efficient description of the invention.

Control unit 14 also includes a memory select logic unit 54 (consisting of combinational logic) through which microprocessor 61 selectively accesses response message storage RAM 51 or program store memory 46 via links 56 and 55, respectively. In addition, an input/output select unit logic unit 44 is employed for selectively accessing the contents of buffers 36, 37 and 41 during the operation of the system. Each of select logic units 54 and 44 is accessed by control signals on control bus 62 and address bus 52 from microprocessor 61.

As mentioned previously, call type unit 13, which comprises buffer 41, may be coupled to the control terminal of a telephone service facility either through the operator's control switch panel for manually controlling the response message to be generated to the caller, or through an interface unit which automatically generates control codes to be stored in buffer 41 for accessing the response messages stored in memory 51. In either case, these codes are coupled over a link 42 and stored in buffer 41. As mentioned above, an additional buffer 53 is coupled over link 43. Buffer 53 is monitored by processor 61 for initiating the operation of the storage and retrieval unit of FIG. 2. As will be described in detail below, link 43 is coupled to a voice detector within the audio interface unit 30 (FIG. 3) which prevents control unit 14 from allocating memory for incoming voice signals until there is actually a voice signal being coupled over link 11. This is employed during the record mode operation wherein the operator will record response messages in her/his own voice for storage in memory 51. Line 43 is monitored by the processor and it is not until the operator actually begins to speak during this record mode that the processor allocates memory for storing the digitized voice, as opposed to simply beginning successively accessing memory addresses for storing the contents of buffer 36 to which digitized voice data is coupled over link 35 from analyzer 32, without regard to whether ADC 24 is actually receiving voice signals or is waiting for those voice signals from the operator and would thereby be supplying useless data to memory.

Operation

Looking now at the operation of the message storage and retrieval unit, there are two modes of operation of the unit RECORD and PLAYBACK.

RECORD MODE

The record mode is employed by the operator at the telephone service facility to record response messages that will be used during the operator's work period. This task may be advantageously carried out at a redundant storage and retrieval system located in a room or area separate from the operator's work station. As mentioned previously, the memory 51, in which response messages are stored, may be contained in the form of a removable cartridge module as part of the hardware of control unit 14, whereby the operator is able to employ a portable and compact mechanism for generating a library of response messages.

Now, in the course of preparing a file of response messages, predetermined (e.g. supervisor approved/edited) response phrases are recorded by the operator as the operator supplies control signals, as through a switch panel coupled to detector 40, for generating response message designation codes to be stored by buffer 41. The messages themselves are coupled via the audio interface unit 30 over audio input link 11, as described above. The particular response message codes and associated response messages are generated and recorded by the operator in order that the processor 61 will know where to store the response messages in RAM 51. Simply put, each response message will be identified by a binary code coupled from the operator switch panel over link 42 and stored in buffer 41. For example, if the operator were to record a response phrase indicating the name of the facility answering the incoming call and a message of inquiry assistance to be read back to the caller, the corresponding switch on the operator's panel would couple an associated code over link 42 to buffer 41. The operator would then proceed to record the message to be stored in memory. As the operator begins recording the message, the voice detector unit within the audio interface unit 30 (FIG. 3) couples a signal over line 43 to buffer 53. Within the control unit 14, processor 61 cycles through the monitoring of buffers 36, 37, 41 and 53 via data bus 45, address bus 52 and control bus 62, in a conventional fashion. When a first voice bit in buffer 53 is detected, processor 61 begins reading out the contents of buffer 36, which receives the digitized voice from analyzer unit 32, as the voice is digitized by ADC 24, coupled to shift register 31 and serialized over link 33 to voice analyzer 32. These digital codes, representative of the voice message to be stored, are coupled over bus 45 and stored in sequential addresses in RAM 51. When the message is complete, as indicated by lack of a voice detect signal on link 43, the processor terminates the generation of address signals for the storage of the message in RAM 51.

Each additional message is handled in the same way until the operator has completed his/her recording of all the response phrases that are to be used during the operator's work period. The response phrase file contained in RAM 51 may then be removed from the unit employed for message recording for subsequent use in the storage and retrieval system at the operator's work station. Again, because the operator is able to record his/her voice in a time frame approximate that during which the operator will be on-line with incoming calls, characteristics of the voice as stored in memory will be substantially identical to that of the operator when the operator is on-line.

PLAYBACK MODE

During the playback mode of operation, when a call type is detected, either through an operator-controlled interface set of switches on the operator's control panel, or automatically, as mentioned above, an access code (corresponding to that originally entered by the operator during the recording of the messages) is coupled over link 42 to buffer 41. Then processor 61 reads the access code stored in buffer 41 and generates the appropriate address signals for accessing the corresponding response message that had been previously stored in memory 51 during the RECORD mode. The response message is coupled from memory 51 over bus 45 and latched in output latch 37. During the read-out cycle provided by input output select logic unit 44, the contents of output buffer 37 are coupled over link 35 to the synthesizer portion of voice analyzer/synthesizer 32, so that analog audio signals are supplied over line 21 corresponding to the message of interest as it is accessed from memory 51. These analog audio signals are coupled over link 21 to audio interface unit 30 in FIG. 3.

AUDIO INTERFACE UNIT (FIG. 3)

Referring now to FIG. 3, there is shown a schematic block diagram of the audio interface unit 30. As explained previously, this unit is coupled to the telephone voice lines for both the operator's position and the caller 70, and to the storage and retrieval unit 20 in FIG. 2. At the operator's position, a dual microphone input is provided from the operator's headset at dual input jack 88. One output of dual input jack 88 is coupled over link 71 to an amplifier 101. The other side of the jack is coupled over link 81 to the sleeve lead of the telephone line at the operator position. The other half of dual input jack 88 has one line 83 grounded while the other line 82 is coupled to the sleeve portion of the telephone link to the caller 70. Amplifier 101 amplifies the operator's input voice signal from the operator's microphone to the appropriate level for the circuitry of the audio interface unit and couples that signal over line 102 to an automatic level control amplifier 103. Line 102 is also coupled to the output of a low pass filter 96 the input of which is coupled to a switch 91 through link 95. Switch 91 is coupled to the audio output link 21 from the storage and retrieval unit 20 in FIG. 2. As mentioned above, link 21 supplies the read-out or synthesized voice that had been previously stored in memory. During the PLAYBACK mode, this voice signal is coupled over link 21 to terminal 93 and over switch link 94 to low pass filter 96. Thus, there is an effective summation of the operator's voice and the audio output over link 102 to the input of automatic level control amplifier 103. During the RECORD mode, there is no output over link 21 to the audio interface unit, so that switch arm 94 is coupled to terminal 92, which is grounded.

The output of automatic level control amplifier 103 is coupled via link 105 to a current-voltage converter 104, terminal 106 of switch 115 and amplifier 116. Current-voltage converter 104 may comprise a transistor amplifier, the collector of which is coupled over link 73 to one input of a diode bridge circuit 74. The other input is coupled to ground. Output 75 of bridge circuit 74 is coupled to the tip lead of the telephone link to the operator position 10 while output 76 is coupled to the tip lead of the telephone link to the caller 70.

Thus, via the dual microphone input jack 88, audio input link 21 and outputs 75 and 76 of bridge circuit 74, both the caller and the operator's headset are coupled in parallel to receive the voice from both the operator's microphone input and th voice from the audio output from the synthesizer.

As mentioned above, output link 105 from automatic level control amplifier 103 is coupled to terminal 106 of switch 115. Like switch 91, switch 115 has PLAYBACK and RECORD mode positions. During the PLAYBACK mode, switch arm 111 of switch 115 is coupled to terminal 107 (floating), so that there is no output coupled over link 112 from terminal 108 to a low pass filter 113. The output of filter 113 is coupled via amplifier 114 to audio input link 11 to the voice analyzer portion of the storage and retrieval unit 20 shown in FIG. 2. In the RECORD mode, however, during which the operator is reading aloud a response message to be stored in memory, switch arm 111 is coupled to terminal 106, so that the operator's voice is coupled over link 11 to the storage and retrieval unit.

A further component of the audio interface unit is a first voice detector which comprises an amplifier 116 coupled to link 105 and a monostable multi-vibrator (or one-shot) 117 coupled to the output of amplifier 116. The output of one-shot 117 is coupled to link 43 to provide a first voice indication. Simply put, amplifier 116 and one-shot 117 monitor line 105 for a voice signal and then supply a trigger signal over line 43 to be stored in buffer 41, as mentioned previously.

Operation

As mentioned above, the audio interface unit operates in either RECORD mode or a PLAYBACK mode.

RECORD MODE

During the RECORD mode, the operator is reading a message to be analyzed and converted into digital signals for storage in memory in the storage and retrieval unit 20 (FIG. 2). During this mode, each of switches 91 and 115 is switched to the RECORD mode position by the operator. The operator then speaks the messages into the microphone of his/her headset. The analog audio signals are coupled over link 71, amplified by amplifier 101 and then level-controlled by amplifier 103. The output of amplifier 103 is coupled via switch 115 to low pass filter 113 and finally to amplifier 114 for application to the audio input link 11 which is coupled to the digital storage and retrieval portion of the system. The operator is able to listen to his/her voice by the coupling of tip leads 75 and 76 and sleeve leads 81 and 82 to the operator's position, as shown in FIG. 3.

PLAYBACK MODE

When the operator has finished recording all of the response messages that will be employed during the operator's tour of duty, the operator changes the positions of switches 91 and 115 to the PLAYBACK position (the position shown in FIG. 3). In this position, switch 91 couples any audio output from the storage and retrieval unit to automatic level control amplifier 103 for application over link 73 to both output tip lead 75 and output tip lead 76. The voice signal is not coupled to the audio input link 11, since switch 115 is effectively open. Any voice signal spoken by the operator into the operator's microphone in his/her headset is coupled via amplifier 101 and link 102 to amplifier 103 and fed downstream to both the operator and caller positions in exactly the same manner as the audio output from the voice synthesizer in the storage and retrieval unit as coupled over link 21. Thus, the operator is able to listen to both the voice message that is being played back from the storage and retrieval portion of the system and his/her own voice when he/she speaks during further conversation with the caller. This monitoring capability and the fact that the operator is listening to his/her own previously recorded voice offers a significant improvement over conventional automatic response systems.

More specifically, the voice that is heard by the caller 70, whether it be the operator's own voice supplied from the operator's microphone over input link 71, or from the audio output from the synthesizer over input line 21, appears to be the same voice, in terms of quality and amplitude. The quality is the same because the voice message is a message in the voice of the operator who is actually providing the service at the telephone facility handling the caller's incoming call. In addition, because both the operator's voice signal supplied from his/her microphone and the synthesized voice signal supplied from the digital storage equipment are coupled to the same amplification and level adjustment circuitry, there is no sharp inflection or level change between the two voice signals. Thus, the storage and retrieval and audio processing circuitry is effectively listener transparent.

An additional advantage of the present invention is the fact that when a response message is initially played back to the caller, the operator, while resting, is listening to that voice response message. When the operator had previously read that message from a carefully prepared and supervised text during the record mode of the system, the operator did so in a clear and courteous manner and pleasant tone while fresh and interested. Because the operator now hears his/her tone of voice being played back in such a manner, the operator is being effectively psychologically stimulated to follow his/her own voice and not create a discontinuity to the listener. Thus, not only does the present invention prevent the above-mentioned confusion problem from arising, but it effectively provides guidance for the operator in the manner in which the operator should speak to the caller, thus acting as a voice refresher.

While we have shown and described one embodiment in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are obvious to one of ordinary skill in the art.

What is claimed:

1. For use with an operator-assisted telephone service facility in which on-line participation by an on-line operator is required for effectively enabling an incoming caller to reach a called destination, an arrangement for providing a response message to said incoming caller accessing said facility comprising:

first operational means for storing at least one prescribed response message, which, when played back, effectively corresponds to the voice of the operator who is on-line with and services incoming calls; and second operational means, coupled to said first operational means and operable in conjunction with the on-line operator's servicing of an incoming call, for accessing a response message from said first operational means in dependence upon information contained within said incoming call being serviced by said on-line operator and which is representative of the type of call to which said incoming call corresponds, and causing said accessed response message to be played back to said incoming caller.

2. An arrangement according to claim 1, wherein said second operational means includes means for providing a path for coupling voice messages from said operator to said incoming caller in addition to coupling said played-back message from said first operational means to said incoming caller.

3. An arrangement according to claim 1, wherein said second operational means includes means for enabling the simultaneous coupling to said incoming caller of a voice message from said operator and of a played-back message from said first operational means.

4. An arrangement according to claim 3, wherein said second operational means includes means for adjusting, in effectively the same manner, at least one prescribed characteristic of each of said voice message from said operator and said played back message from said first operational means.

5. An arrangement according to claim 4, wherein said adjusting means includes means for adjusting the amplitude of messages coupled by said second operational means to said incoming caller.

6. An arrangement according to claim 1, wherein said second means includes means for coupling a voice message from said operator to be stored by said first means through a common signal-flow path for a response message played back as a voice message to said incoming caller.

7. An arrangement according to claim 1, wherein said first operational means includes means for initiating the storage of a response message as voiced by said operator in response to the voicing of said message by said operator.

8. An arrangement according to claim 1, wherein said second operational means includes means for enabling said operator to monitor said incoming call and the response message played back in response thereto while also being able to effect a voice communication with said incoming caller.

9. An arrangement according to claim 8, wherein said second operational means includes means for adjusting, in effectively the same manner, at least one prescribed characteristic of each of a voice communication from said operator and a response message played back to an incoming caller.

10. For use with an operator-assisted telphone service facility in which on-line participation by an on-line operator is requried for effectively enabling an incoming caller to reach a called destination, a method of supplying response messages to an incoming caller accessing said facility comprising the steps of:
(a) storing at least one prescribed response message which, when played back, effectively corresponds to the voice of the operator who is on-line with and services incoming calls; and
(b) in conjunction with the on-line operator's servicing of an incoming call, accessing a response message from said at least one prescribed response message in dependence upon information contained within said incoming call being serviced by said on-line operator and which is representative of the type of call to which; said incoming call corresponds, and causing said response message to be played back to said incoming caller.

11. A method according to claim 10, further including the step of
(c) enabling the coupling of voice messages from said operator to said incoming caller in addition to causing said response message to be played back to said incoming caller.

12. A method according to claim 10, wherein step (b) includes simultaneously enabling the coupling to said incoming caller of a voice message from said operator and playing back an accessed response message to said incoming caller.

13. A method according to claim 12, further including the step of
(c) adjusting, in effectively the same manner, at least one prescribed characteristic of each of said voice message from said operator and said played back message.

14. A method according to claim 13, wherein step (c) includes adjusting the amplitude of messages coupled to said incoming caller.

15. A method according to claim 10, wherein step (b) includes coupling a voice message from said operator to be stored through a common signal-flow path for a response message played back as a voice message to said incoming caller.

16. A method according to claim 15, wherein said step (b) includes simultaneouly enabling the coupling to said incoming caller of a voice message from said operator and a response message played back as a voice message.

17. A method according to claim 16, wherein step (b) includes adjusting at least one prescribed characteristic of each of said voice message from said operator and said played back message in effectively the same manner.

18. A method according to claim 10, wherein step (a) includes initiating the storage of a response message as voiced by said operator in response to the voicing of said message by said operator.

19. A method according to claim 10, wherein step (b) includes enabling said operator to monitor said incoming call and the response message played back in response thereto while also providing the capability of effecting a voice communication with said incoming caller.

20. A method according to claim 19, wherein step (b) comprises the step of adjusting, in effectively in the same manner, at least one prescribed characteristic of each of a voice communication from said operator and a response message played back to an incoming caller.

21. For use with an operator-assisted telephone service facility in which on-line participation by an on-line ooerator is required for effectively enabling an incoming caller to reach a called destination, an arrangement for providing a response message to an incoming caller accessing said facility comprising:
(a) a response message storage and retrieval unit adapted to store and retrieve at least one prescribed response message, which, when played back, effectively corresponds to the voice of the operator who is on-line with and services incoming calls; and
(b) an audio interface unit, coupled to said response message storage and retrieval unit, which is operable in conjunction with the on-line operator's servicing of an incoming call and accesses a response message from said response message storage and retrieval unit in dependence upon information contained within the incoming call being serviced by said on-line operator and which is representative of the type of call to which said incoming call corresponds, and causes said accessed response message to be played back to said incoming caller.

22. An arrangement according to claim 21, wherein said audio interface unit includes means for enabling the operator to monitor an incoming call and a response message accessed from said storage and retrieval unit and played back to said incoming caller, while also being able to effect a voice communication with said incoming caller.

23. An arrangement according to claim 22, wherein said audio interface unit includes means for adjusting, in effectively the same manner, at least one prescribed characterized of each of a voice communication from said operator and a response message played back to an incoming caller.

* * * * *